Jan. 6, 1970  J. D. WALLACE  3,488,082
STEP AND DOOR SUPPORT ASSEMBLY FOR CAMPING TRAILER
Filed Jan. 24, 1968  2 Sheets-Sheet 1
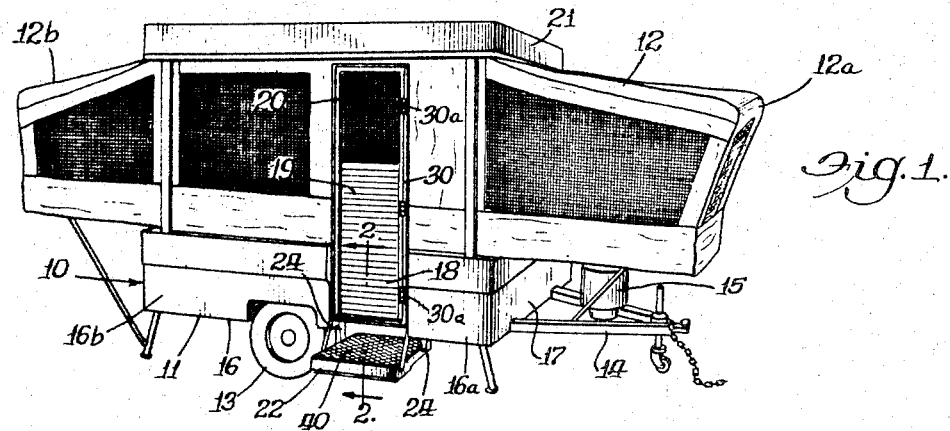
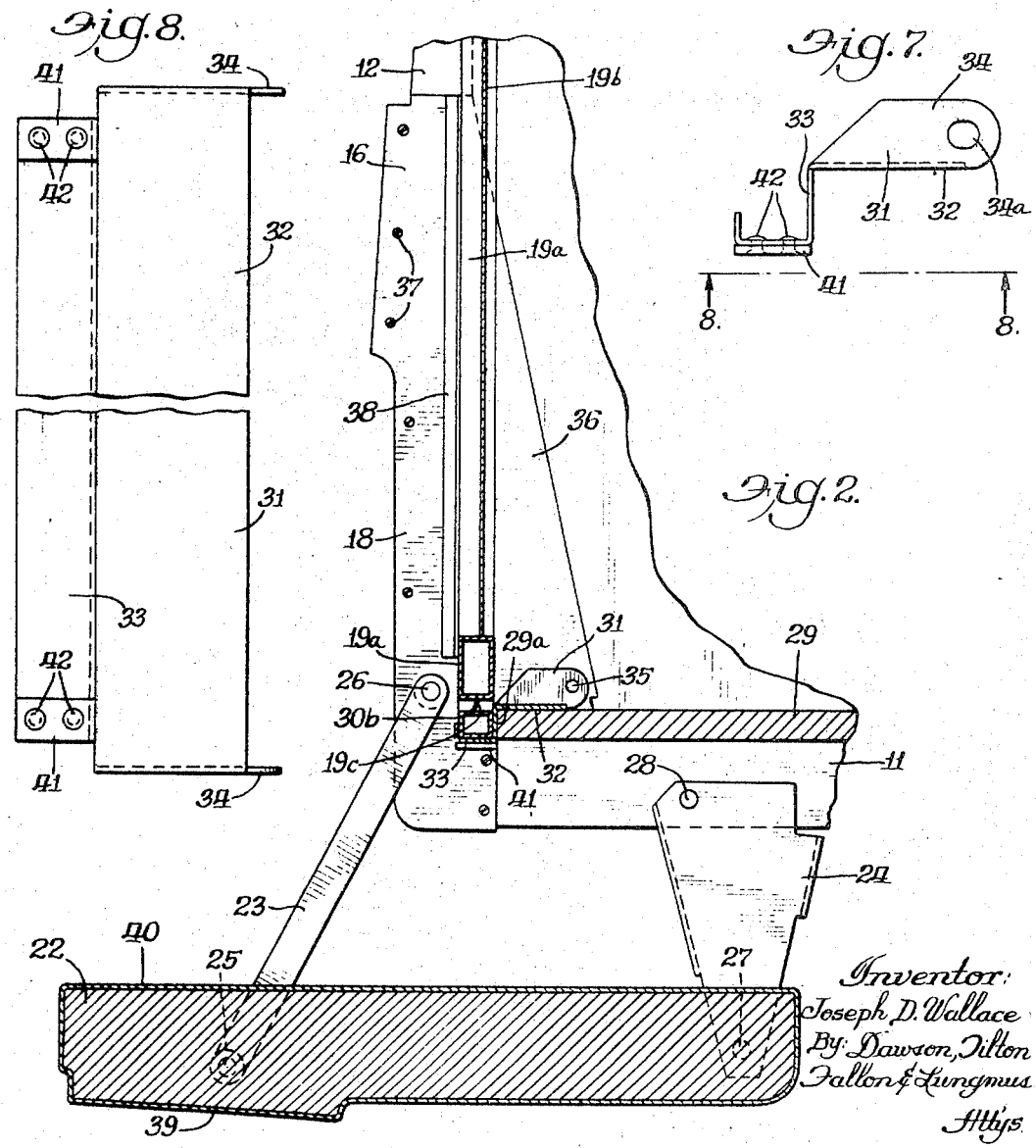
Inventor:
Joseph D. Wallace
By: Dawson, Tilton
Fallon & Lungmus
Attys.

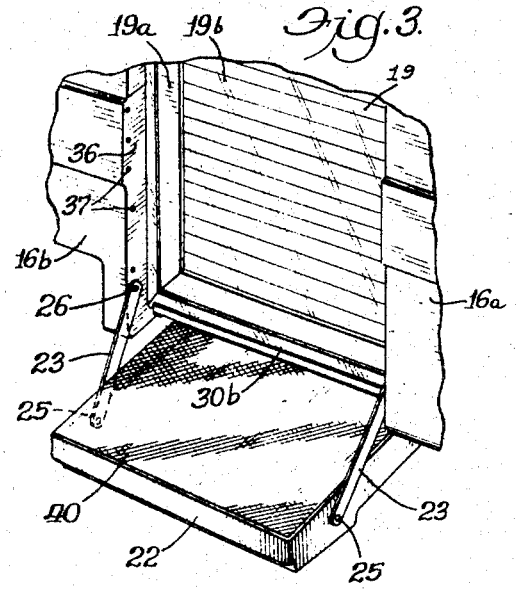
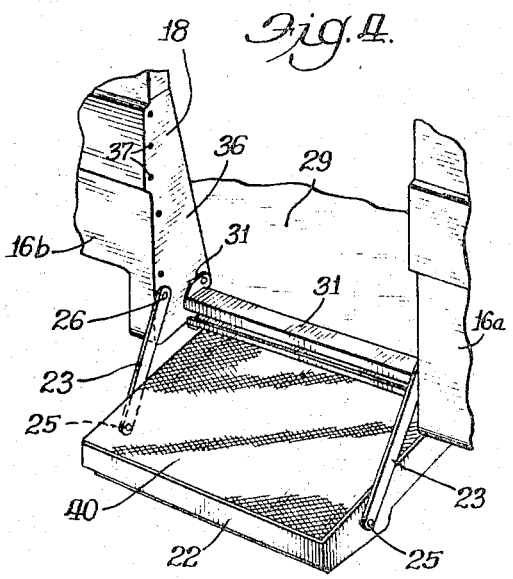
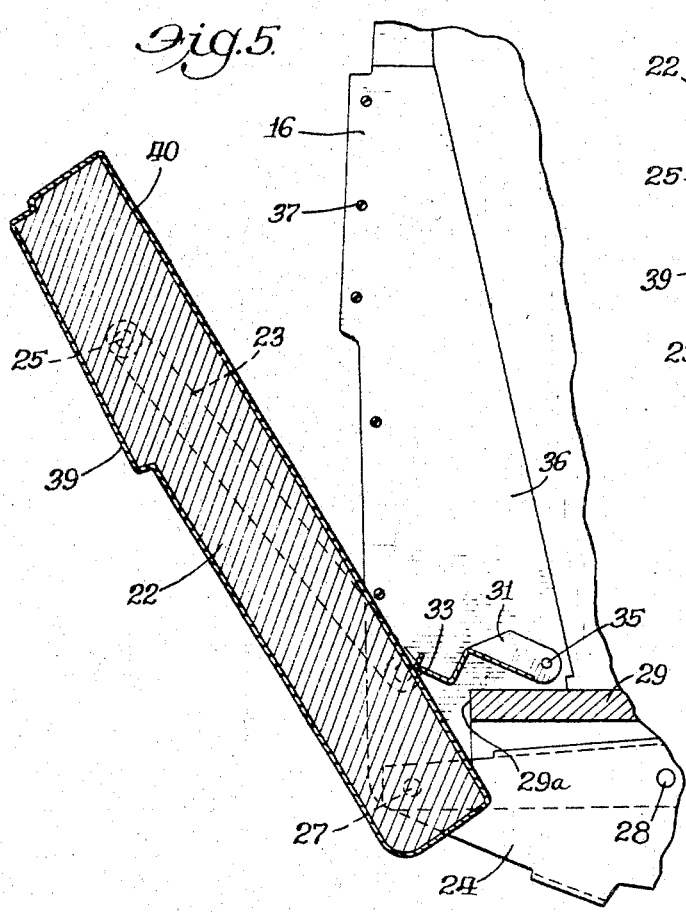
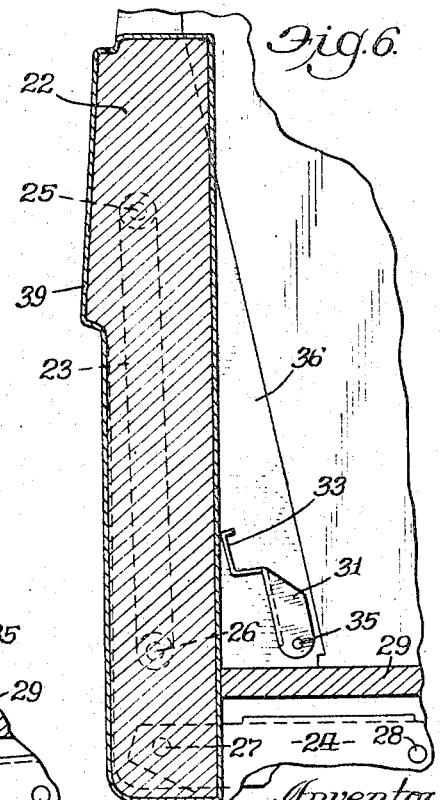
Inventor
Joseph D. Wallace
By Dawson, Tilton,
Fallon & Lungmus
Attys.

United States Patent Office 3,488,082
Patented Jan. 6, 1970

3,488,082
STEP AND DOOR SUPPORT ASSEMBLY FOR CAMPING TRAILER
Joseph D. Wallace, Wichita, Kans., assignor to The Coleman Company, Inc., Wichita, Kans., a corporation of Kansas
Filed Jan. 24, 1968, Ser. No. 700,103
Int. Cl. B60p 3/32
U.S. Cl. 296—23                                5 Claims

ABSTRACT OF THE DISCLOSURE

A step and door support assembly for a camping trailer which includes a removable door. The door support is pivotally mounted on the trailer frame within the doorway opening of the frame and includes a channel-shaped trough for receiving and supporting the removable door. The step is also pivotally mounted on the frame and is movable from a generally horizontal position to a position closing the doorway opening in the trailer sides. As the step is pivoted upwardly, it engages the door support and pivots the support upwardly out of the door opening to permit the step to close the opening. The door support automatically re-positions itself to receive the door when the step is returned to the horizontal position.

Background of the invention

This invention relates to camping trailers, and, more particularly, to a step and door support assembly for camping trailers.

Camping trailers are generally provided with a fixed frame having relatively short side walls. When the camping trailer is to be used, a tent-like structure or canopy is placed over the fixed frame and supported thereon to provide an enclosure for sleeping, cooking, and the like. Both the fixed frame and the canopy are provided with a doorway opening which receives a removable door hingedly mounted in a door frame to provide access to the camping trailer. The trailer also generally includes a step mounted on the frame below the door opening to facilitate entry to and exit from the interior of the trailer. This step is advantageously swingable upwardly after the door is removed to close the doorway opening in the trailer sides when the trailer is to be moved from one camping site to another.

A problem has arisen in providing a suitable mounting for the door which effects a sufficient seal to keep undesirable bugs and insects from the camping trailer interior but also which will not interfere with the easy removability of the door and subsequent closing of the doorway opening by the step when the camping trailer is to be moved. The mounting means should also be positioned so that it does not present a safety hazard.

It is desirable to have the bottom of the frame to which the door is hingedly secured positioned below the floor of the trailer to decrease the likelihood that a person might trip as he enters or leaves the trailer. However, this would generally require some sort of supporting means for the door within the doorway opening, and this supporting means would have to be removed from the doorway opening before the step could be raised. In the confusion and hurry which frequently accompanies the departure of a family or hunting group from a camp site, one might inadvertently attempt to close the step without first removing the supporting means, thereby perhaps damaging either the step or the supporting means.

Summary of the invention

This invention permits the door to be mounted in such a way that the door and door frame are supported in a safe position which substantially decreases the likelihood of tripping or damage to the door support. The support bracket which supports the bottom of the door within the doorway opening is automatically moved out of the doorway opening as the step is pivoted upwardly to close the doorway opening, and is also automatically returned to the supporting position when the step is lowered.

Description of the drawing

FIG. 1 is a perspective view of a camping trailer equipped with the inventive step and door support assembly;
FIG. 2 is an enlarged fragmentary sectional view taken along the line 2—2 of FIG. 1;
FIG. 3 is an enlarged fragmentary perspective view of the step and doorway opening of the trailer;
FIG. 4 is a view similar to FIG. 3 with the door removed;
FIG. 5 is a view similar to FIG. 2 with the door removed and the step in the process of being raised;
FIG. 6 is a view similar to FIG. 5 showing the step closing the doorway opening;
FIG. 7 is a side elevation view of the door support; and
FIG. 8 is a bottom plan view of the support taken along the line 8—8 of FIG. 7.

Description of specific embodiment

Referring now to FIG. 1, the numeral 10 designates generally a camping trailer provided with a frame 11 and a tent-like foldable superstructure or canopy 12. The frame 11 is mounted on wheels 13 and is provided with a trailer hitch 14 which may carry a fuel tank 15 of propane or the like for providing fuel to the usual stove (not shown) located within the interior of the trailer. The frame 11 also includes generally vertically extending sidewalls 16 and 17, and sidewall 16 is seen to be interrupted to provide a forward portion 16a and a rearward portion 16b which define a doorway opening 18. Although only two sidewalls are shown, it is to be understood that the trailer usually includes four sidewalls to provide a generally rectangular horizontal cross section.

The canopy 12 may include front and rear overhanging porch sections 12a and 12b, respectively, which are provided with screened openings or windows. The canopy 12 is also provided with a doorway opening so that a door 19 may be removably mounted on the frame. The upper portion of the door 19 includes a screen window 20, and if desired, the screen may extend along substantially the entire length of the door.

Since this type of camping trailer is well-known in the industry, it is believed unnecessary to give a detailed description herein. It is sufficient to say that the canopy can be disassembled and folded in a compact manner to fit within the relatively shallow enclosure provided by the vertically extending sides. Trailer top 21 may then be positioned on top of the trailer sides and suitably secured thereto, and the trailer is ready to be pulled by an automobile or truck.

A step 22 is suspended from the trailer frame below the doorway opening to facilitate entering and leaving the inside of the trailer. Referring to FIGS. 2 and 3, the step 22 is seen to be pivotally secured to the frame by a pair of straps 23 and a pair of plates 24. The straps 23 are pivotally secured to opposite sides of the step as at 25 and also to the trailer side portions 16a and 16b within the doorway opening as at 26. Plates 24 are also pivotally secured to opposite sides of the step as at 27 and are pivotally secured to the frame as at 28.

Floor 29 extends between the trailer sides and provides the bottom for the enclosure defined by the sidewalls. Referring to FIGS. 2 and 3, the door 19 is carried by a four-sided door frame 30, and the door is hingedly secured to the door frame by suitable hinges 30*a* along one of the vertical sides of the frame. Each side of the door frame may be generally box-like in cross section to provide a light but sturdy construction, and the door is preferably mounted within the doorway opening 18 so that bottom 30*b* of the door frame does not extend to any great extent above the upper surface of the floor 29 (FIG. 2). Thus, when the door is opened, the door frame is not likely to trip anyone stepping from the floor 29 to the step 22 or vice versa, and the door frame is less likely to be damaged by someone stepping on it. The door 19 may include a perimetrically extending hollow channel portion 19*a* and a relatively thin wall portion 19*b* extending between the channel portions below the window 20. A rubber sealing strip 19*c* extends downwardly from the bottom of the door and engages the bottom 30*b* of the frame 30 when the door is closed.

The door frame 30 and door 19 are mounted within the doorway opening 18 by door support 31. Referring to FIGS. 2, 7 and 8, door support 31 includes an elongated generally planar ledge portion 32 and a generally channel-shaped trough 33 depending from the ledge portion and having a length slightly less than that of the ledge portion. The ends of the ledge portion are provided with a pair of generally perpendicular sides 34 provided with openings 34*a* which are pivotally secured as at 35 to generally triangularly shaped face plates 36. The face plates define the doorway opening in the trailer side 16 and are attached to trailer side portions 16*a* and 16*b* by screws 37. The face plates also aid in reinforcing the interrupted trailer side 16. In FIG. 2 the ledge portion 32 is seen to extend generally parallel with the trailer floor 29 and engages the upper surface thereof. The ledge portion 32 extends just over the edge of the floor 29 so that the depending trough 33 is positioned adjacent the outer edge 29*a* of the floor.

The bottom 30*b* of the door frame is received by the channel-shaped trough 33 and supported therein, and the portion of the door frame extending above trailer side 16 may be attached to the canopy 12 in the conventional manner by means of zippers, snaps, or the like. A seal between the bottom of the door frame and the trailer frame is provided by the engagement of the door frame with the door support, and a conventional door seal 38 (FIG. 2) may be provided on the lower portion of the sides of door frame to engage the face plates 36.

When the door frame is received by the trough 33 of the door support, the bottom 30*b* of the door frame extends only slightly, if at all, above the top of the trailer floor 29. Thus, there are no projections adjacent the trailer door threshold which might tend to trip a person entering or leaving the trailer or which might be damaged if stepped on. The ledge portion 32 of the door support, which bears against the trailer floor 29 and provides support for the trough 33, is seen to be relatively flat and thin and does not present an appreciable hazard.

When the trailer is to be towed, the door 19 is disconnected from the canopy 12 by means of the zipper or snaps, and the door 29 and door frame 30 are lifted from the trough 33. The step 22 is then pivoted upwardly on the straps 23 and plates 24, as shown in FIG. 5, and as the step approaches a vertical position, it engages the trough 33 of the door support 31 and pivots the door support upwardly out of the doorway opening 18. Lifting of the step thus automatically causes the door support to be rotated safely out of the way of the step, and there is no danger that the door support will inadvertently be left in the doorway opening and be damaged by the step or prevent proper closing of the doorway. The step lifted until it assumes a generally vertical position in alignment with the trailer side wall 16 (FIG. 6) in which the step closes the doorway opening provided in the trailer side 16. The bottom surface 39 of the step advantageously has the same contour as the outer surface of the trailer sides so that when the step is in the raised position it forms an almost continuous and imperceptible extension of the interrupted trailer side 16. Suitable locking means may be provided to maintain the step in this position.

When the step is in the vertical or doorway-closing position, the door support 31 has not quite been rotated over its pivot 35 and is inclined against the step 22 (FIG. 6). Thus, when the trailer is again to be used, the step 22 is pivoted downwardly to its generally horizontal position, and the door support 31 follows the step downwardly until it rotates into its door supporting position illustrated in FIG. 2. Both the step and door support are thereby moved into their proper position by the same motion, and an additional step is not needed to position the door support after the step is lowered.

Referring to FIGS. 7 and 8, the bottom of the trough 33 may be provided with protective pads 41 so that the door support will not scratch or mar the upper or stepping surface 40 of the step, which may be provided with a ribbed rubber pad or other suitable skid-preventing material. In the particular embodiment illustrated a pair of pads 41 are secured adjacent the ends of the trough by rivets 42, but a single protective pad may be provided if desired.

While in the foregoing specification, I have set forth a detailed description of an embodiment of my invention for the purpose of illustration, it is to be understood that many of the details herein given may be varied considerably by those skilled in the art without departing from the spirit and scope of my invention.

I claim:

1. In a camping trailer having a frame including trailer sides, one of said sides being provided with a doorway opening, a step pivotally mounted on said frame and movable from a generally horizontal position to a position at least partially closing said doorway opening, and a door support pivotally mounted on said frame and movable from a lowered position within said doorway opening to a raised position, said door support adapted to support a door removably positioned in said doorway opening, said door support being engageable with said step when said step is moved to the doorway-closing position whereby said door support is pivotable upwardly to the raised position.

2. The structure of claim 1 in which said frame includes a floor, said door support including a generally channel-shaped trough and ledge means, said ledge means engaging said floor, said trough depending from said ledge means below said floor when said door support is in the lowered position.

3. In a camping trailer having a frame including a floor and trailer sides, one of said sides being provided with a doorway opening, a step pivotally mounted on said frame and movable from a generally horizontal position below said floor to a generally vertical position at least partially closing said doorway opening, a door support pivotally mounted on said frame and movable from a lowered position to a raised position, said door support including a generally channel-shape elongated trough having a length slightly less than the width of the doorway opening and a supporting ledge, said ledge engaging said floor and said trough depending from said ledge below said floor within said doorway opening when said door support is in the lowered position, said trough being engageable with said step when said step is moved to the doorway-closing position whereby said door support is pivotable upwardly to the raised position.

4. The structure of claim 3 in which said door support is supported in the raised position by said step.

5. The structure of claim 3 in which said ledge extends at an acute angle with respect to said floor when said door support is in the raised position whereby said door support pivots downwardly as said step is moved from the doorway-closing position to the horizontal position.

References Cited
UNITED STATES PATENTS

| | | | |
|---|---|---|---|
| 115,665 | 6/1871 | Wells | 280—166 |
| 1,542,113 | 6/1925 | Vogel | 280—166 |

PHILIP GOODMAN, Primary Examiner

U.S. Cl. X.R.

280—163